(12) United States Patent
Schultz et al.

(10) Patent No.: US 10,079,789 B2
(45) Date of Patent: *Sep. 18, 2018

(54) SHARED ATTACHMENTS

(71) Applicant: MICROSOFT TECHNOLOGY LICENSING, LLC, Redmond, WA (US)

(72) Inventors: Tracy Schultz, Seattle, WA (US); Bram Paperman, Montreal (CA); Sunil Swami, Sammamish, WA (US); Nicole Steinbok, Redmond, WA (US); Steven Geffner, Bothell, WA (US); Jeffrey Kohler, Redmond, WA (US); Gary Caldwell, Redmond, WA (US); Nino Yuniardi, Seattle, WA (US); Peter Leonard, Seattle, WA (US); Eli Tamanaha, Lynnwood, WA (US); Nina Shih, Redmond, WA (US); Isaac Jacobsen, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 256 days.

This patent is subject to a terminal disclaimer.

(21) Appl. No.: 14/887,086

(22) Filed: Oct. 19, 2015

(65) Prior Publication Data

US 2016/0043976 A1     Feb. 11, 2016

Related U.S. Application Data

(63) Continuation of application No. 12/963,091, filed on Dec. 8, 2010, now Pat. No. 9,165,285.

(51) Int. Cl.
| | | |
|---|---|---|
| G06F 3/048 | (2013.01) | |
| H04L 12/58 | (2006.01) | |
| G06Q 10/10 | (2012.01) | |

(52) U.S. Cl.
CPC ............. H04L 51/08 (2013.01); G06Q 10/10 (2013.01)

(58) Field of Classification Search
CPC ...................................................... G06F 3/048
See application file for complete search history.

(56) References Cited

U.S. PATENT DOCUMENTS

| | | |
|---|---|---|
| 5,355,472 A | 10/1994 | Lewis |
| 5,787,480 A | 7/1998 | Scales et al. |

(Continued)

FOREIGN PATENT DOCUMENTS

| | | |
|---|---|---|
| CN | 1449525 A | 10/2003 |
| CN | 1749998 A | 3/2006 |

(Continued)

OTHER PUBLICATIONS

Office Action dated Jan. 31, 2014, issued in U.S. Appl. No. 13/096,869, 28 pgs.

(Continued)

*Primary Examiner* — Peiyong Weng
(74) *Attorney, Agent, or Firm* — Merchant & Gould P.C.

(57) ABSTRACT

When an outgoing communication sent to one or more recipients contains a supported attachment type, a shared workspace that contains a shared version of the original attachment is provisioned. A modified version of the original outgoing communication is delivered to internal recipients including both a link to the shared document and the original attachment.

20 Claims, 7 Drawing Sheets

(56) References Cited

U.S. PATENT DOCUMENTS

| | | |
|---|---|---|
| 5,864,870 A | 1/1999 | Guck |
| 5,903,723 A | 5/1999 | Beck et al. |
| 6,219,818 B1 | 4/2001 | Freivald et al. |
| 6,275,850 B1 | 8/2001 | Beyda et al. |
| 6,314,425 B1 | 11/2001 | Serbinis et al. |
| 6,397,261 B1 | 5/2002 | Eldridge et al. |
| 6,405,225 B1 | 6/2002 | Apfel |
| 6,493,758 B1 | 12/2002 | McLain |
| 6,533,822 B2 | 3/2003 | Kupiec |
| 6,687,741 B1 | 2/2004 | Ramaley et al. |
| 6,718,368 B1 | 4/2004 | Ayyadurai |
| 6,763,496 B1 | 7/2004 | Hennings et al. |
| 6,782,423 B1 | 8/2004 | Nakayama et al. |
| 6,839,741 B1 | 1/2005 | Tsai |
| 6,883,009 B2 | 4/2005 | Yoo |
| 6,948,131 B1 | 9/2005 | Neven |
| 6,954,934 B2 | 10/2005 | Kumar |
| 6,978,276 B2 | 12/2005 | Demsky et al. |
| 7,003,551 B2 | 2/2006 | Malik |
| 7,028,075 B2 | 4/2006 | Morris |
| 7,054,905 B1 | 5/2006 | Hanna et al. |
| 7,089,287 B2 | 8/2006 | Bellotti et al. |
| 7,107,518 B2 | 9/2006 | Ramaley et al. |
| 7,113,948 B2 | 9/2006 | Jhingan et al. |
| 7,127,670 B2 | 10/2006 | Bendik |
| 7,130,885 B2 | 10/2006 | Chandra et al. |
| 7,143,091 B2 | 11/2006 | Charnock et al. |
| 7,178,099 B2 | 2/2007 | Meyer et al. |
| 7,194,514 B1 | 3/2007 | Yen et al. |
| 7,290,034 B2 | 10/2007 | Budd et al. |
| 7,353,232 B1 | 4/2008 | Kalucha et al. |
| 7,392,280 B2 | 6/2008 | Rohall et al. |
| 7,401,291 B2 | 7/2008 | Ramaley et al. |
| 7,409,394 B2 | 8/2008 | Lee |
| 7,409,424 B2 | 8/2008 | Parker |
| 7,424,543 B2 | 9/2008 | Rice, III |
| 7,424,676 B1 | 9/2008 | Carlson et al. |
| 7,444,382 B2 | 10/2008 | Malik |
| 7,509,386 B2 | 3/2009 | Miyashita |
| 7,536,440 B2 | 5/2009 | Budd et al. |
| 7,546,352 B1 | 6/2009 | Bhattiprolu et al. |
| 7,565,409 B2 | 7/2009 | Heilbron et al. |
| 7,580,982 B2 | 8/2009 | Owen et al. |
| 7,593,943 B2 | 9/2009 | Clarke et al. |
| 7,650,387 B2 | 1/2010 | Foo et al. |
| 7,730,082 B2 | 6/2010 | Sah et al. |
| 7,752,269 B2 | 7/2010 | Chan et al. |
| 7,783,711 B2 | 8/2010 | LeVasseur et al. |
| 7,783,972 B2 | 8/2010 | Camps et al. |
| 7,814,425 B1 | 10/2010 | O'Shaugnessy et al. |
| 7,840,642 B2 | 11/2010 | Naick et al. |
| 7,908,332 B2 | 3/2011 | Malik |
| 7,917,591 B2 | 3/2011 | Vakkalanka |
| 7,970,850 B1 | 6/2011 | Callanan |
| 8,108,464 B1 | 1/2012 | Rochelle et al. |
| 8,140,975 B2 | 3/2012 | Lemay et al. |
| 8,145,707 B2 | 3/2012 | Thayer et al. |
| 8,176,123 B1 | 5/2012 | Wang et al. |
| 8,185,591 B1 | 5/2012 | Lewis |
| 8,196,029 B1 | 6/2012 | Rucker |
| 8,458,269 B2 | 6/2013 | Friedman et al. |
| 8,682,989 B2 | 3/2014 | Meisels et al. |
| 8,965,983 B2 | 2/2015 | Costenaro et al. |
| 9,137,185 B2 | 9/2015 | Costenaro et al. |
| 9,165,285 B2 | 10/2015 | Schultz et al. |
| 2001/0051991 A1 | 12/2001 | Beyda et al. |
| 2001/0054073 A1 | 12/2001 | Ruppert et al. |
| 2002/0016818 A1 | 2/2002 | Kirani et al. |
| 2002/0059384 A1 | 5/2002 | Kaars |
| 2002/0062356 A1 | 5/2002 | Clarke et al. |
| 2002/0065892 A1 | 5/2002 | Malik |
| 2002/0107931 A1 | 8/2002 | Singh et al. |
| 2002/0129056 A1 | 9/2002 | Conant et al. |
| 2002/0133633 A1 | 9/2002 | Kumar |
| 2002/0138586 A1 | 9/2002 | Paleiov et al. |
| 2002/0143691 A1 | 10/2002 | Ramaley et al. |
| 2002/0174010 A1 | 11/2002 | Rice, III |
| 2003/0028528 A1 | 2/2003 | Christensen et al. |
| 2003/0028600 A1 | 2/2003 | Parker |
| 2003/0055907 A1 | 3/2003 | Stiers |
| 2003/0112273 A1 | 6/2003 | Hadfield et al. |
| 2003/0131062 A1 | 7/2003 | Miyashita |
| 2004/0034688 A1* | 2/2004 | Dunn ............... G06Q 10/107 709/206 |
| 2004/0068545 A1 | 4/2004 | Daniell et al. |
| 2004/0103044 A1 | 5/2004 | Vandewater et al. |
| 2004/0158607 A1 | 8/2004 | Coppinger et al. |
| 2004/0186894 A1 | 9/2004 | Jhingan et al. |
| 2004/0243672 A1 | 12/2004 | Markki et al. |
| 2004/0261082 A1 | 12/2004 | Steere et al. |
| 2005/0010799 A1 | 1/2005 | Kelley et al. |
| 2005/0033813 A1 | 2/2005 | Bhogal et al. |
| 2005/0044492 A1 | 2/2005 | Ramaley et al. |
| 2005/0060382 A1 | 3/2005 | Spector et al. |
| 2005/0091289 A1 | 4/2005 | Shappell et al. |
| 2005/0114672 A1 | 5/2005 | Duncan et al. |
| 2005/0122345 A1 | 6/2005 | Kim et al. |
| 2005/0166154 A1 | 7/2005 | Wilson et al. |
| 2005/0188026 A1 | 8/2005 | Hilbert et al. |
| 2005/0251443 A1 | 11/2005 | Chan et al. |
| 2005/0289221 A1 | 12/2005 | Steele |
| 2006/0004819 A1 | 1/2006 | Claudatos et al. |
| 2006/0020673 A1 | 1/2006 | Sorge et al. |
| 2006/0031309 A1 | 2/2006 | Luoffo et al. |
| 2006/0075046 A1 | 4/2006 | Yozell-Epstein et al. |
| 2006/0095527 A1 | 5/2006 | Malik |
| 2006/0195526 A1 | 8/2006 | Lederer et al. |
| 2006/0206570 A1 | 9/2006 | Heidloff et al. |
| 2006/0224679 A1 | 10/2006 | Kikuchi et al. |
| 2006/0242208 A1 | 10/2006 | Goldick |
| 2006/0259524 A1 | 11/2006 | Horton |
| 2006/0282762 A1 | 12/2006 | Diamond et al. |
| 2006/0294455 A1 | 12/2006 | Morris et al. |
| 2007/0005717 A1 | 1/2007 | LeVasseur et al. |
| 2007/0022166 A1 | 1/2007 | Bhogal et al. |
| 2007/0118598 A1 | 5/2007 | Bedi et al. |
| 2007/0118794 A1 | 5/2007 | Hollander et al. |
| 2007/0130259 A1 | 6/2007 | Daniell et al. |
| 2007/0136814 A1 | 6/2007 | Lee et al. |
| 2007/0143419 A1 | 6/2007 | Plas |
| 2007/0143425 A1 | 6/2007 | Kieselbach et al. |
| 2007/0168459 A1 | 7/2007 | Fujita et al. |
| 2007/0192490 A1 | 8/2007 | Minhas |
| 2007/0198913 A1 | 8/2007 | Terao et al. |
| 2007/0208782 A1 | 9/2007 | Carter et al. |
| 2007/0233794 A1 | 10/2007 | Singh |
| 2007/0271344 A1 | 11/2007 | Danasekaran et al. |
| 2007/0271502 A1 | 11/2007 | Bedi et al. |
| 2007/0283267 A1 | 12/2007 | Jeffrey et al. |
| 2008/0005139 A1 | 1/2008 | Hysom et al. |
| 2008/0028017 A1 | 1/2008 | Garbow et al. |
| 2008/0059539 A1 | 3/2008 | Chin et al. |
| 2008/0120382 A1 | 5/2008 | Heidloff et al. |
| 2008/0244721 A1 | 10/2008 | Barrus |
| 2008/0250474 A1 | 10/2008 | Bhogal et al. |
| 2008/0256458 A1 | 10/2008 | Aldred et al. |
| 2008/0281924 A1 | 11/2008 | Gadwale |
| 2008/0282159 A1 | 11/2008 | Vanderwende et al. |
| 2008/0288862 A1 | 11/2008 | Smetters et al. |
| 2009/0006948 A1 | 1/2009 | Parker et al. |
| 2009/0024931 A1 | 1/2009 | Bae |
| 2009/0030919 A1 | 1/2009 | Brezina et al. |
| 2009/0030997 A1 | 1/2009 | Malik |
| 2009/0031245 A1 | 1/2009 | Brezina et al. |
| 2009/0063520 A1 | 3/2009 | Kimura |
| 2009/0094514 A1 | 4/2009 | Dargahl et al. |
| 2009/0100109 A1 | 4/2009 | Turski et al. |
| 2009/0157831 A1 | 6/2009 | Tian et al. |
| 2009/0187852 A1 | 7/2009 | Tsurata |
| 2009/0210721 A1 | 8/2009 | Phillips |
| 2009/0248808 A1 | 10/2009 | Izumi et al. |
| 2009/0313256 A1 | 12/2009 | Konduri et al. |
| 2009/0319618 A1 | 12/2009 | Affronti et al. |
| 2010/0011032 A1 | 1/2010 | Fukuoka |

(56) References Cited

U.S. PATENT DOCUMENTS

| | | | |
|---|---|---|---|
| 2010/0017701 A1 | 1/2010 | Bargeron et al. |
| 2010/0023492 A1 | 1/2010 | Lucas |
| 2010/0057765 A1 | 3/2010 | Dispensa et al. |
| 2010/0057864 A1 | 3/2010 | Laird-McConnell |
| 2010/0057872 A1 | 3/2010 | Koons et al. |
| 2010/0070448 A1 | 3/2010 | Omoigui |
| 2010/0070588 A1 | 3/2010 | Sinn et al. |
| 2010/0076989 A1* | 3/2010 | Jakobson ............... G06Q 10/00 707/758 |
| 2010/0082713 A1 | 4/2010 | Fird-nielsen et al. |
| 2010/0095198 A1 | 4/2010 | Bultrowicz et al. |
| 2010/0100566 A1 | 4/2010 | Hronopoulos |
| 2010/0106551 A1 | 4/2010 | Koskimies et al. |
| 2010/0125640 A1 | 5/2010 | Boddington et al. |
| 2010/0169295 A1 | 7/2010 | Kanamori |
| 2010/0169439 A1 | 7/2010 | O'Sullivan et al. |
| 2010/0169440 A1 | 7/2010 | O'Sullivan et al. |
| 2010/0191774 A1 | 7/2010 | Mason, Jr. et al. |
| 2010/0198927 A1 | 8/2010 | Tonnison et al. |
| 2010/0228611 A1 | 9/2010 | Shenfield |
| 2010/0228989 A1 | 9/2010 | Neystadt et al. |
| 2010/0235763 A1 | 9/2010 | Massand |
| 2010/0273456 A1 | 10/2010 | Wolovitz et al. |
| 2010/0281224 A1 | 11/2010 | Ho et al. |
| 2010/0306180 A1 | 12/2010 | Johnson et al. |
| 2010/0306330 A1 | 12/2010 | Friedman et al. |
| 2011/0055177 A1 | 3/2011 | Chakra et al. |
| 2011/0065419 A1 | 3/2011 | Book |
| 2011/0066955 A1 | 3/2011 | Olson et al. |
| 2011/0113104 A1 | 5/2011 | Bhogal et al. |
| 2011/0119593 A1 | 5/2011 | Jacobson et al. |
| 2011/0145363 A1 | 6/2011 | Ananthanarayanan et al. |
| 2011/0161435 A1 | 6/2011 | Mancuso |
| 2011/0276897 A1 | 11/2011 | Crevier et al. |
| 2012/0095890 A1 | 4/2012 | Santarlas |
| 2012/0117159 A1 | 5/2012 | Chakra et al. |
| 2012/0151379 A1 | 6/2012 | Schultz |
| 2012/0192064 A1 | 7/2012 | Antebi et al. |
| 2012/0278281 A1 | 11/2012 | Meisels et al. |
| 2012/0278401 A1 | 11/2012 | Meisels et al. |
| 2012/0278402 A1 | 11/2012 | Limont et al. |
| 2012/0278403 A1 | 11/2012 | Costenaro et al. |
| 2012/0278404 A1 | 11/2012 | Meisels et al. |
| 2012/0278405 A1 | 11/2012 | Costenaro et al. |
| 2012/0278407 A1 | 11/2012 | Meisels et al. |
| 2012/0284344 A1 | 11/2012 | Costenaro et al. |
| 2012/0284345 A1 | 11/2012 | Costenaro et al. |
| 2014/0173423 A1 | 6/2014 | Meisels et al. |
| 2016/0006832 A1 | 1/2016 | Costenaro et al. |

FOREIGN PATENT DOCUMENTS

| | | | |
|---|---|---|---|
| CN | 1753400 A | 3/2006 |
| CN | 1795654 | 6/2006 |
| CN | 1831827 A | 9/2006 |
| CN | 1971553 A | 5/2007 |
| CN | 101009667 A | 8/2007 |
| CN | 101079846 A | 11/2007 |
| CN | 101655845 A | 2/2010 |
| CN | 101655870 | 2/2010 |
| EP | 933712 A2 | 8/1999 |
| JP | H05135056 A | 6/1993 |
| JP | 08235231 A | 9/1996 |
| JP | 10269236 A | 10/1998 |
| JP | 11161584 A | 6/1999 |
| JP | 11345182 A | 12/1999 |
| JP | 2001043151 A | 2/2001 |
| JP | 2001307006 A | 11/2001 |
| JP | 2002049615 | 2/2002 |
| JP | 2002091813 A | 3/2002 |
| JP | 2005011354 A | 1/2005 |
| JP | 2005025620 A | 1/2005 |
| JP | 2005084945 | 3/2005 |
| JP | 2005129061 A | 5/2005 |
| JP | 2007501969 | 2/2007 |
| JP | 2007213511 A | 8/2007 |
| JP | 2008-500646 | 1/2008 |
| WO | 2003052622 | 6/2003 |
| WO | 2005027404 | 3/2005 |
| WO | 2007/133504 A2 | 11/2007 |
| WO | 2009/023769 A1 | 2/2009 |
| WO | 2009158108 A2 | 12/2009 |
| WO | 2010041505 A1 | 4/2010 |
| WO | 2010104659 A2 | 9/2010 |

OTHER PUBLICATIONS

Office Action dated Apr. 8, 2014, issued in U.S. Appl. No. 13/102,431, 16 pgs.
Office Action dated Jul. 10, 2014, issued in U.S. Appl. No. 13/096,869, 29 pgs.
Office Action dated Jul. 16, 2014, issued in U.S. Appl. No. 13/102,431, 20 pgs.
Office Action dated Aug. 14, 2014, issued in U.S. Appl. No. 13/096,854, 32 pgs.
Office Action dated Sep. 26, 2014, issued in U.S. Appl. No. 13/096,936, 29 pgs.
Office Action dated Oct. 6, 2014, issued in U.S. Appl. No. 13/096,880, 31 pgs.
Office Action dated Oct. 7, 2014, issued in U.S. Appl. No. 13/096,910, 32 pgs.
Notice of Allowance dated Oct. 14, 2014 issued in U.S. Appl. No. 13/102,431, 51 pgs.
Office Action dated Oct. 23, 2014, issued in U.S. Appl. No. 13/096,899, 24 pgs.
Office Action dated Apr. 9, 2015, issued in U.S. Appl. No. 13/096,936, 23 pgs.
Office Action dated Apr. 20, 2015, issued in U.S. Appl. No. 13/096,880, 25 pgs.
Notice of Allowance dated Apr. 28, 2015, issued in U.S. Appl. No. 13/096,910, 23 pgs.
Office Action dated Jun. 23, 2015, issued in U.S. Appl. No. 13/096,899, 30 pgs.
Office Action dated Jun. 26, 2015, issued in U.S. Appl. No. 13/096,854, 50 pgs.
PCT Search Report in PCT/US2012/035707 dated Nov. 26, 2012.
PCT Search Report in PCT/US2012/035708 dated Nov. 26, 2012.
PCT Search Report in PCT/US2012/035709 dated Nov. 26, 2012.
PCT Search Report in PCT/US2012/035710 dated Sep. 28, 2012.
PCT Search Report in PCT/US2012/036701 dated Nov. 28, 2012.
PCT Search Report in PCT/US2012/036702 dated Dec. 3, 2012.
Sendthisfile.com; "Welcome to SendThisFile"; accessed Jan. 7, 2011, from http://www.sendthisfile.com/; 1 pg.
Thapa, Shyam; "Microsoft SharePoint 2010—Features and Benefits," copyright 2005-2009 EzineMark.com, 3 pages.
Troost et al., Internet Engineering Task Force, RFC 2183 dated Aug. 1997, 12 pgs. available at: www.rfc-editor.org/rfc/rfc2183.txt.
U.S. Appl. No. 13/096,830 entitled Making Document Changes by Replying to Electronic Messages, filed Apr. 28, 2011.
U.S. Appl. No. 13/096,854 entitled Presenting Links to Content as Attachments in Electronic Messages, filed Apr. 28, 2011.
U.S. Appl. No. 13/096,869, entitled Presenting Link Information Near Links Within Electronic Messages, filed Apr. 28, 2011.
U.S. Appl. No. 13/096,880, entitle Upload of Attachment and Insertion of Link Into Electronic Messages, filed Apr. 28, 2011.
U.S. Appl. No. 13/096,899, entitled Storing Metadata Inside File to Reference Shared Version of File, filed Apr. 28, 2011.
U.S. Appl. No. 13/096,910, entitled "Uploading Attachment to Shared Location and Replacing with a Link", filed May 12, 2012.
U.S. Appl. No. 13/096,936, entitled Automatic Uploading of Attachment to a Shared Location, filed Apr. 28, 2011.
U.S. Appl. No. 13/102,431, entitled Changes to Documents are Automatically Summarized in Electronic Messages, filed May 6, 2011.
U.S. Appl. No. 13/102,875, entitled Setting Permissions for Links Forwarded in Electronic Messages, filed May 6, 2011.

(56) References Cited

OTHER PUBLICATIONS

U.S. Appl. No. 14/188,666 entitled Making Document Changes by Replying to Electronic Messages, filed Feb. 24, 2014.
Vogel et al., "Consistency Control for Synchronous and Asynchronous Collaboration Based on Shared Objects and Activities"; Computer Supported Copperative Work (CSCW); Kluwer Academic Publishers, vol. 13, No. 5-6; Dec. 1, 2004; pp. 573-602 (cited in Apr. 23, 2015 EP Comm.).
Wikipedia, Message, http://en.wikipedia.org/wikilMessage retrieved Jan. 9, 2014, p. 1-2.
Australian Office Action Full Examination Report Issued in Patent Application No. 2012253808, dated Jul. 3, 2016, 3 Pages.
Chinese Office Action Issued in Patent Application No. 201280021905.6, dated Jul. 1, 2016, With english translation. 10 pgs.
Japanese Notice of Allowance Issued in Patent Application No. 2014-508169, dated Jul. 12, 2016, 3 Pages. Without English Translation.
Japanese Office Action Issued in Patent Application No. 2014-510385, dated May 30, 2016, With english translation. 9 Pages.
Russian Office Action Issued in Patent Application No. 2013149178, dated May 20, 2016, With English Translation. 9 Pages.
Chinese Office Action Issued in Patent Application No. 201280020342.9, dated Aug. 1, 2016, With English translation. 10 pages.
Chinese Second Office Action and Search Report Issued in Chinese Patent Application No. 201280020368.3, dated Aug. 5, 2016, 10 pages. With English Translation.
Chinese Second Office Action dated Aug. 29, 2016 in Application No. 201280021954.x, 5 pages.
Chinese Second Office Action Issued in Chinese Patent Application No. 201280020441.7, dated Aug. 1, 2016, 14 Pages. With English Translation.
European Office Action Issued in Application No. 12782951.3, dated Aug. 17, 2016, 6 pages.
Japanese Notice of Allowance Issued in Patent Application No. 2014-508170, dated Sep. 13, 2016, 3 Pages.
Japanese Notice of Allowance Issued in Patent Application No. 2014-508171, dated Aug. 4, 2016, 4 Pages.
Taiwan Office Action and Search Report Issued in Taiwan Patent Application No. 101110617, dated Jul. 26, 2016, 7 Pages.
U.S. Appl. No. 13/096,899, Office Action dated Sep. 26, 2016, 36 pages.
Office Action Issued in Chinese Patent Application No. 201280020342.9, dated Oct. 31, 2016, 11 Pages.
Office Action Issued in Chinese Patent Application No. 201280020368.3, dated Dec. 27, 2016, 10 Pages.
Office Action Issued in Chinese Patent Application No. 201280021905.6, dated Nov. 29, 2016, 11 Pages.
Second Office Action and Search Report Issued in Chinese Patent Application No. 201280020430.9, dated Nov. 1, 2016, 11 Pages.
JP: Office Action Issued in Japanese Patent Application No. 2014-508168, dated Oct. 7, 2016, 8 Pages.
JP: Notice of Allowance Issued in Japanese Patent Application No. 2014-508171, dated Aug. 4, 2016, 4 Pages.
AU: Office Action Issued in Australian Patent Application No. 2012253808, dated Sep. 16, 2016, 3 Pages.
U.S. Appl. No. 14/188,666, Office Action dated Oct. 25, 2016, 24 pgs.
U.S. Appl. No. 13/096,854, Office Action dated Jan. 11, 2017, 39 pgs.
U.S. Appl. No. 13/096,880, Office Action dated Oct. 25, 2016, 20 pgs.
U.S. Appl. No. 13/102,875, Office Action dated Nov. 14, 2016, 27 pgs.
Australian Notice of Allowance in Application 2012253808, dated Nov. 28, 2016, 2 pages.
Chinese Notice of Allowance in Application 201280021954.X, dated Dec. 22, 2016, 4 pages.
Chinese Office Action in Application 201280020441.7, dated Jan. 25, 2017, 10 pages.
Chinese Office Action in Application 201280020430.9, dated Feb. 27, 2017, 8 pages.
Japanese Office Action in Application 2014-510384, dated Oct. 13, 2016, 6 pages.
Taiwanese Notice of Allowance in Application 101110617, dated Nov. 16, 2016, 4 pages.
U.S. Appl. No. 13/096,830, Notice of Allowance dated Nov. 8, 2013, 8 pages.
U.S. Appl. No. 13/096,854, Advisory Action dated Dec. 3, 2014, 5 pages.
U.S. Appl. No. 13/096,869, Advisory Action dated Dec. 3, 2014, 4 pages.
U.S. Appl. No. 13/096,880, Advisory Action dated Jul. 27, 2015, 5 pages.
U.S. Appl. No. 13/096,880, Advisory Action dated Sep. 18, 2015, 3 pages.
U.S. Appl. No. 13/096,880, Advisory Action dated Oct. 15, 2015, 4 pages.
U.S. Appl. No. 13/102,431, Notice of Allowance dated Jan. 27, 2015, 2 pages.
Chinese Office Action dated Dec. 29, 2015 in Appln No. 201280021954.x, 16 pgs.
Chinese Office Action dated Feb. 1, 2016 in Appln No. 201280020342.9, 12 pgs.
Chinese Office Action dated Mar. 4, 2016 in Appln No. 201280020430.9, 11 pgs.
European Office Action Issued in Application No. 12777397.6, dated Mar. 3, 2016, 6 pgs.
Japanese Office Action Issued in Patent Application No. 2014-508168, dated Mar. 23, 2016, 8 Pages.
Japanese Office Action Issued in Patent Application No. 2014-508169, dated Feb. 10, 2016, 11 Pages.
Japanese Office Action Issued in Patent Application No. 2014-508170, dated Mar. 22, 2016, 5 Pages.
Japanese Office Action Issued in Patent Application No. 2014-508171, dated Mar. 11, 2016, 6 Pages.
Taiwan Office Action and Search Report Issued in Taiwan Patent Application No. 101110617, dated Mar. 21, 2016, 6 Pages.
U.S. Appl. No. 13/096,880, Office Action dated Feb. 19, 2016, 19 pgs.
U.S. Appl. No. 13/096,936, Office Action dated Mar. 22, 2016, 20 pgs.
U.S. Appl. No. 13/102,875, Office Action dated Apr. 20, 2016, 22 pgs.
U.S. Appl. No. 14/188,666, Office Action dated Feb. 26, 2016, 77 pgs.
U.S. Appl. No. 13/096,854, Office Action dated May 2, 2016, 35 pgs.
"Final Office Action Issued in U.S. Appl. No. 12/963,091", dated Sep. 25, 2014, 18 Pages.
"Final Office Action Issued in U.S. Appl. No. 12/963,091", dated Jan. 9, 2013, 16 Pages.
"Non-Final Office Action Issued in U.S. Appl. No. 12/963,091", dated Sep. 7, 2012, 15 Pages.
"Non-Final Office Action Issued in U.S. Appl. No. 12/963,091", dated Jun. 16, 2014, 16 Pages.
"Notice of Allowance Issued in U.S. Appl. No. 12/963,091", dated Jun. 15, 2015, 11 Pages.
U.S. Appl. No. 14/188,666, Notice of Allowance dated Apr. 20, 2017, 6 pages.
Japaneses Notice of Allowance in Application 2014-510384, dated Mar. 31, 2017, 3 page.
Chinese Office Action in Application 201280020441.7, dated Jun. 2, 2017, 9 pages.
U.S. Appl. No. 13/096,880, Office Action dated Jun. 14, 2017, 13 pages.
U.S. Appl. No. 14/188,666, Supplemental Notice of Allowance dated Jul. 11, 2017, 2 pages.
U.S. Appl. No. 13/096,854, Office Action dated Jun. 29, 2017, 29 pages.
U.S. Appl. No. 13/102,875, Office Action dated Jul. 5, 2017, 19 pages.

(56) References Cited

OTHER PUBLICATIONS

U.S. Appl. No. 14/188,666, Supplemental Notice of Allowance dated Jul. 26, 2017, 2 pages.
Russian Notice of Allowance in Application 2013149178, dated Jun. 15, 2017, 17 pages.
Toyoko Abe et al.; "Object Bulletin Board for Group Cooperative Work" printed in a collection of papers (1997-2006 Version 1.1) presented at DICOMO symposium sponsored by Information Processing Society of Japan on Aug. 31, 2006 (pp. 513-518) (DVD-ROM), 8 pages.
Japanese Office Action Issued in Patent Application No. 2014-510384, dated May 9, 2016, 6 Pages.
Russian Office Action Issued in Patent Application No. 2013149178, dated May 20, 2016, 8 Pages. No English Translation.
U.S Appl. No. 12/963,091, entitled Shared Attachments, filed Dec. 8, 2010.
U.S. Appl. No. 14/853,098, entitled "Uploading Attachment to Shared Location and Replacing with a Link", filed Sep. 14, 2015.
Chinese Office Action and Search Report Issued in Chinese Patent Application No. 201280020368.3, dated Dec. 2, 2015, 14 pgs.
Chinese Office Action and Search Report Issued in Patent Application No. 201280021905.6, dated Dec. 2, 2015, 14 pgs.
Chinese Office Action and Search Report Issued in Chinese Patent Application No. 201280020441.7, dated Dec. 15, 2015, 18 Pages.
Office Action dated Sep. 21, 2015, issued in U.S. Appl. No. 13/102,875, 53 pgs.
Office Action dated Nov. 23, 2015, issued in U.S. Appl. No. 13/096,936, 21 pgs.
Office Action dated Jan. 5, 2016, issued in U.S. Appl. No. 13/096,899, 19 pgs.
"Attachment Manager for Outlook," accessed at http://assistmyteam.com/downloads/manuals/AttachmentManager.pdf, accessed on Jan. 7, 2011, 14 pages.
"Attachments Processor for Microsoft Outlook," accessed at http://www.-office-addins.com/outlook-addins/attachments-processor.html, accessed on Jan. 6, 2011, 3 pages.
"Cloud File Server Features—Complete List," Egnyte, Inc. copyright 2010, 5 pages.
"Collaborative Document Review Online: Please Review," accessed at http://www.masternewmedia.org/news/2005/06/02/collaborative_document_review_online_pleasereview.htm, accessed on Jan. 4, 2010, 4 pages.
"Display Last Edited Time Information," copyright 2000, 2002, 2003, 2007 phpBB Limited, 7 pages.
"Going beyond e-mail: Collaborating with Office," accessed at http://office.microsoft.com/en-us/outlook-help/going-beyond-e-mail-collaborating-with-office-HA001017429.aspx, accessed on Jan. 4, 2010; 10 pages.
"harmon.ie for SharePoint," harmon.ie copyright 1993-2011, 3 pages.
"How to show last modified workflow date in a column on the main list page," copyright 2009-2010 sharepointdev.net, 4 pages.
"OL2000: Changing from Local Delivery to Server and Offline," copyright 2011 Microsoft, 4 pages.
"Outlook Attachment Sniffer," accessed at http://www.rsbr.de/Software/OASniffer/index.htm, accessed on Jan. 6, 2011, 2 pages.
"Outlook Connector for MDaemon," accessed at http://www.redline-software.com/eng/support/docs/mdaemon/c6s4.php, accessed on Jan. 6, 2011, 7 pages.
"Outlook Shared Attachment as Hyperlink," accessed at http://thedailyreviewer.com/windowsapps/view/outlook-shared-attachment-as-hyperlink-11367085, accessed on Dec. 30, 2010, 5 pages.
Decouchant et al.; "Griffon: A Cooperative, Structured, Distributed Document Editor"; 1993; http://citeseerx.ist.psu.edu/viewdock/download?doi=10.1.1.51.759&rep=rep1&type=pdf; 28 pages.
Devendorf, Gary; "Outlook putting attachments in Sharepoint"; Feb. 13, 2008; http://my.advisor.com/blog/garydev.nsf/d6plinks/GDEF-7BSUA2; 5 pages.

Docstoc; "OneClick: Email Large Documents Without Attaching Files"; retrieved Jan. 7, 2011, from http://www.docstoc.com/oneclick/; 4 pgs.
Edholm, Y.; "Email Attachments: The Scourge of the Network," Simplex Knowledge Company copyright 2008, 3 pages.
EP Communication dated Apr. 23, 2015 in Appln No. PCT/US2012/035710, 8 pgs.
EP Extended Search Report in PCT/US2012/035707 dated Oct. 21, 2014, 6 pgs.
EP Extended Search Report in PCT/US2012/035708 dated Aug. 29, 2014, 6 pgs.
EP Extended Search Report in PCT/US2012/035709 dated Sep. 22, 2014, 6 pgs.
EP Extended Search Report in PCT/US2012/036702 dated Aug. 12, 2014, 6 pgs.
EP Search Report in PCT/US2012/036701 dated Dec. 4, 2014, 5 pgs.
Hsieh et al.; "Activity Links: Supporting Communication and Reflection about Action," copyright 2005 ACM, 10 pages.
Jatowt et al.; "Change Summarization in Web Collections," accessed at http://citeseerx.ist.psu.edu/viewdoc/download?doi=10.1.1.73.7999&rep=rep1&type=pdf; accessed on Jan. 4, 2010, 10 pages.
Kelly, Will; "How to Use Adobe Acrobat for Online Document Reviews" Sep. 3, 2009, 8 pages.
Lenahan, T.; "5 New Google Docs Features You Might Have Missed," copyright 2010 MakeUseOf, 9 pages.
Masternewmedia.com; "How to Send Large Files without Email"; Last updated: Jan. 6, 2011; retrieved Jan. 7, 2011, from http://www.masternewmedia.org/how_to_send_large_files_without_email/; 3 pgs.
McCoy et al.; "SharePoint Workspace and the Office Document Cache," posted Mar. 12, 2010 at: http:/blogs.msdn.com/b/sharepoint_workspace_development_team/archive/2010/03/12/sharepoint-workspace-and-the-office-document-cache.aspx, 2 pages.
Microsoft Support; "You may receive an 'Outlook blocked access to the following potentially unsafe attachments' message in Outlook"; Last Review: May 13, 2010; http://support.microsoft.com/kb/829982; 7 pgs.
MSDN.com; "How to Share Large Files Without Attaching Them"; Aug. 21, 2008; retrieved Jan. 7, 2011, from http://blogs.msdn.com/b/outlook/archive/2008/08/21/how-to-share-large-files-without-attaching-them.aspx; 3 pgs.
Office Action dated Jun. 20, 2012, issued in U.S. Appl. No. 13/096,899.
Office Action dated Oct. 3, 2012, issued in U.S. Appl. No. 12/096,830.
Office Action dated Nov. 13, 2012, issued in U.S. Appl. No. 13/096,910.
Office Action dated Nov. 21, 2012, issued in U.S. Appl. No. 13/096,936.
Office Action dated Nov. 26, 2012, issued in U.S. Appl. No. 13/102,431.
Office Action dated Dec. 11, 2012, issued in U.S. Appl. No. 13/096,854.
Office Action dated Dec. 14, 2012, issued in U.S. Appl. No. 13/096,869.
Office Action dated Dec. 26, 2012, issued in U.S. Appl. No. 13/096,880.
Office Action dated Jan. 2, 2013, issued in U.S. Appl. No. 13/102,875.
Office Action dated Feb. 11, 2013, issued in U.S. Appl. No. 13/096,899.
Office Action dated Jun. 4, 2013, issued in U.S. Appl. No. 13/096,936.
Office Action dated Jun. 10, 2013, issued in U.S. Appl. No. 13/102,431.
Office Action dated Jun. 11, 2013, issued in U.S. Appl. No. 13/096,910.
Office Action dated Jun. 20, 2013, issued in U.S. Appl. No. 13/096,854.
Office Action dated Jun. 21, 2013, issued in U.S. Appl. No. 13/096,830.
Office Action dated Jun. 21, 2013, issued in U.S. Appl. No. 13/096,869.
Office Action dated Jul. 16, 2013, issued in U.S. Appl. No. 13/096,880.
Office Action dated Sep. 24, 2013, issued in U.S. Appl. No. 13/096,899.

(56) References Cited

OTHER PUBLICATIONS

Office Action dated Nov. 22, 2013, issued in U.S. Appl. No. 13/102,875.
Office Action dated Jan. 15, 2014, issued in U.S. Appl. No. 13/096,854.
Korean Office Action in Application 10-2013-7029310, dated Nov. 28, 2017, 7 pages.
Korean Office Action in Application 10-2013-7028430, dated Oct. 23, 2017, 11 pages.
Chinese Office Action in Application 201280020342.9, dated Sep. 29, 2017, 11 pages.
European Communication in Application 12777074.1, dated Oct. 16, 2017, 7 pages.
Korean Office Action in Application 10-2013-7028280, dated Oct. 21, 2017, 11 pages.
Chinese Office Action in Application 201280020368.3, dated Nov. 6, 2017, 10 pages.
Korean Office Action in Application 10-2013-702827, dated Oct. 23, 2017, 11 pages.
Chinese Notice of Allowance in Application 201280020430.9, dated Aug. 29, 2017, 4 pages.
Chinese Office Action in Application 201280021905.6, dated Sep. 19, 2017, 9 pages.
U.S. Appl. No. 14/853,098, Office Action dated Aug. 4, 2017, 12 pages.
U.S. Appl. No. 13/096,899, Office Action dated Aug. 15, 2017, 24 pages.
Re@DNotify, How to forward emails "As Attachments", Retrieved on Jul. 2, 2009 by the WayBack Machine, 7 pages.
U.S. Appl. No. 13/096,854, Office Action dated Dec. 28, 2017, 29 pages.
Korean Office Action in Application 10-2013-7029294, dated Oct. 23, 2017, 10 pages.
European Office Action in Application 12777397.6, dated Jan. 3, 2018, 6 pages.
Canadian Office Action in Application 2835323, dated Jan. 25, 2018, 4 pages.
Chinese Decision on Reexamination in Application 201280021905.6, dated Jan. 29, 2018, 14 pages. (No English Translation.).
European Summons in Application 12782951.3, dated Feb. 13, 2018, 7 pages.
U.S. Appl. No. 14/853,098, Office Action dated Feb. 8, 2018, 11 pages.
Chinese Decision on Reexamination in Application 201280020342.9, dated Mar. 30, 2018 15 pages.
U.S. Appl. No. 13/096,899, Office Action dated Mar. 19, 2018, 20 pages.
Chinese Notice of Allowance in Application 201280021905.6, dated Mar. 27, 2018, 4 pages.
U.S. Appl. No. 13/102,875, Office Action dated Mar. 16, 2018, 18 pages.

\* cited by examiner

SHARED ATTACHMENTS

RELATED APPLICATIONS

This application is a continuation of U.S. application Ser. No. 12/963,091, filed Dec. 8, 2010, entitled Shared Attachments, and assigned U.S. Pat. No. 9,165,285 the disclosure of which is hereby incorporated by reference in its entirety.

BACKGROUND

In many instances, document sharing via e-mail attachment precludes efficient collaboration. For example, proper document versioning and co-authoring may be hampered by virtue of multiple instances of a document being passed between multiple individuals via e-mail. The perceived benefit of forwarding a document by e-mail may therefore be negated by inefficiencies incurred and compounded throughout document workflow.

SUMMARY

In one aspect, a method for provisioning a shared document workspace in a computing system environment is disclosed. The method includes receiving a communication addressed to one or more recipients at a computing device, wherein the communication includes an attachment and a link to a shared version of the attachment in a shared workspace; retrieving recipient-specific metadata of each of the one or more recipients, the recipient-specific metadata including permissions for providing access to the shared version of the attachment; sending a provision message for provisioning the shared version of the attachment accessible to internal recipients of the one or more recipients based on the recipient-specific metadata; and releasing the communication to the internal recipients including the attachment and the link to the shared version of the attachment in the shared workspace.

In another aspect, a computing device including a processing unit and a system memory connected to the processing unit is disclosed. The system memory includes instructions that, when executed by the processing unit, cause the processing unit to implement an application configured to provision a shared document workspace in a computing system environment, wherein the application is configured to: receive a communication addressed to one or more recipients including first metadata, a first attachment, and a first link to a first shared document in the shared document workspace corresponding to the first attachment; retrieve recipient-specific permissions of each of the one or more recipients based on the first metadata, the recipient-specific permissions including permissions for providing access to the first shared document; send a first provision message to a collaboration service including a request to provision the first shared document accessible to internal recipients of the one or more recipients based on evaluation of the recipient-specific permissions; and send a first modified communication to the internal recipients including the first attachment and the first link to the first shared document.

In yet another aspect, a computer readable storage medium is disclosed. The computer readable storage medium includes computer-executable instructions that, when executed by a computing device, cause the computing device to perform steps comprising: receiving a communication addressed to one or more recipients, wherein the communication includes an attachment and a link to a shared version of the attachment in a shared workspace, and wherein the communication is selected from a group including: an e-mail message, a text message, and an instant message; retrieving recipient-specific metadata of each of the one or more recipients based on a recipient identification contained within the communication specific to each of the one or more recipients, wherein the recipient-specific metadata including permissions for providing access to the shared version of the attachment, and the attachment is selected from a group including: a document file, a program file, and a media file; sending a provision message for provisioning the shared version of the attachment accessible to internal recipients of the one or more recipients based on the recipient-specific metadata; releasing the communication to the internal recipients including the attachment and the link to the shared version of the attachment in the shared workspace; and releasing the communication to external recipients of the one or more recipients including only the attachment.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is directed towards provisioning a shared document workspace based on an attachment contained within an electronic communication in a computing system environment.

Shared document workspace provisioning techniques described herein include a client-side process that monitors outgoing electronic communications sent to one or more recipients. When an outgoing communication contains a supported attachment type, a secondary communication is created and transferred to a server-side process. The secondary communication includes metadata and a copy of the attachment of the original communication.

In one example, a provisioning service polls for arrival of the secondary communication and then communicates with a collaboration service to provision a workspace that contains a shared version of the original attachment. A modified version of the original outgoing communication is subsequently delivered to internal recipients including both a link to the shared document and the original attachment.

In this manner, benefits of document versioning and co-authoring as provided by the document collaboration service are extended to most or all recipients, while assuring that recipients who are offline or otherwise disconnected from the document collaboration service still have access to the original attachment. Although not so limited, an appreciation of the various aspects of the present disclosure will be gained through a discussion of the examples provided below.

Figure 1:
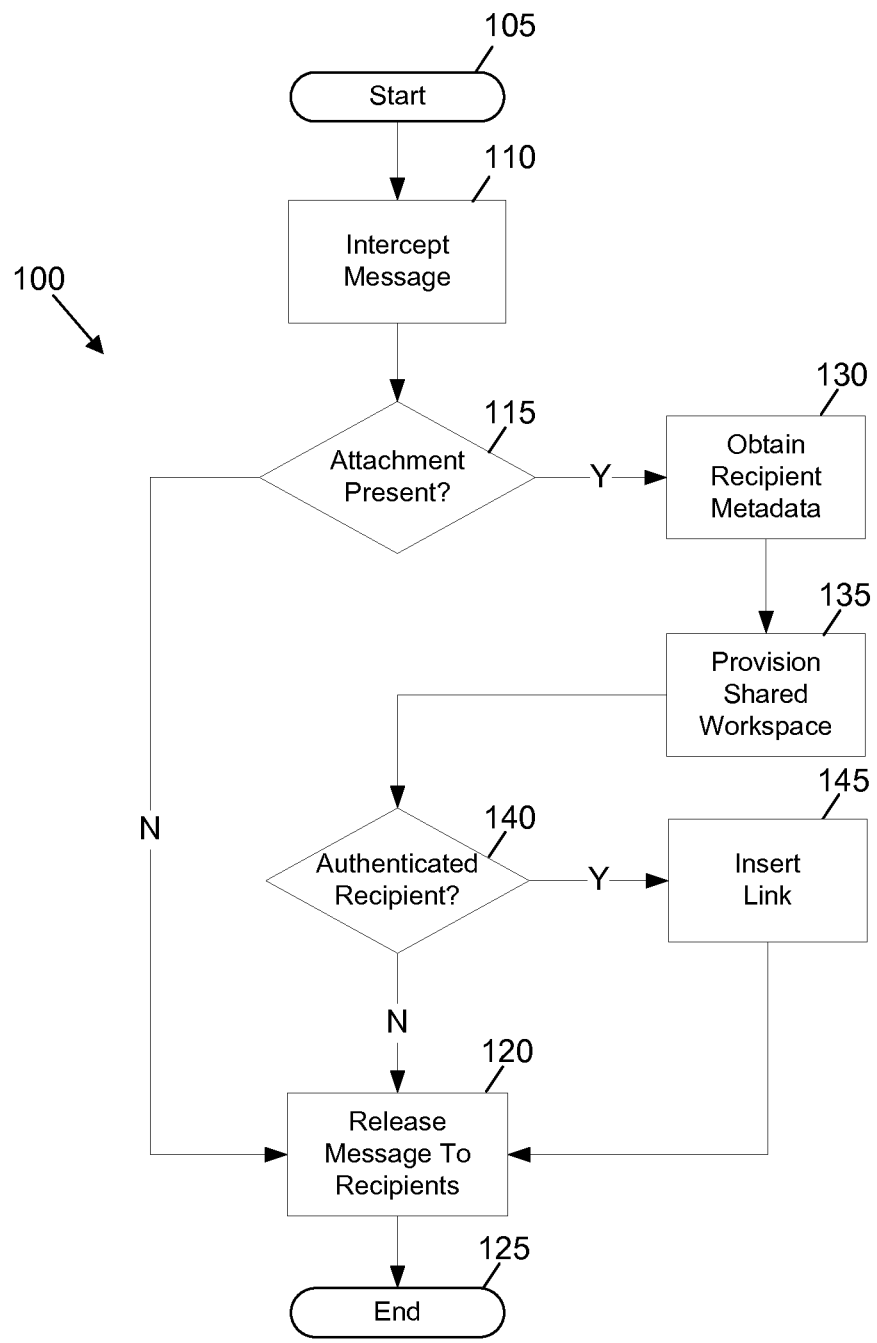
FIG. 1 is a flowchart of an example method for provisioning a shared workspace based on an attachment contained within an electronic communication.

Referring now to FIG. 1, an example method 100 for provisioning a shared workspace based on an attachment contained within an electronic communication is shown. In one embodiment, the method 100 is implemented by one or more computing devices in a computing system environment described in further detail below in connection with FIGS. 2-8.

The method 100 begins at a start module 105. The start module 105 corresponds to a sender utilizing a messaging application executing on a client computing device to compose and send an electronic communication to one or more recipients. An example electronic communication includes an e-mail message, a text message, an SMS message, an instant message (IM), and any other type of message containing information intended for a recipient.

Operational flow proceeds to an intercept module 110. The intercept module 110 is configured to intercept the communication prior to delivery to designated recipients. Next, operational flow proceeds to a first decision module 115. The first decision module 115 is configured to analyze the intercepted communication to determine whether the communication includes an attachment. An example attachment includes any type of electronic file or folder, such as a document file, a program file, a media file, and others.

When the first decision module 115 determines that the intercepted communication does not include an attachment, operational flow proceeds to a delivery module 120. In the example instance, the delivery module 120 is configured to release the original communication to designated recipients. These recipients may access the communication in a compatibly configured messaging application. Following release of the communication by the delivery module 120, operational flow proceeds to an end module 125 corresponding to termination of the example method 100.

When the first decision module 115 determines that the communication includes an attachment, operational flow proceeds to an acquisition module 130. The acquisition module 130 is configured to retrieve metadata corresponding to each recipient specified in the original communication. In general, each recipient is specifically identified based on a corresponding "recipient id" contained within the communication. Additionally, the retrieved metadata enables provisioning of a shared document workspace and can include recipient-specific permissions information, as described further below.

Following acquisition of recipient-specific metadata by the acquisition module 130, operational flow proceeds to a provision module 135. The provision module 135 is configured to examine acquired recipient-specific metadata and provision a shared document workspace accessible only to internal recipients of the original communication. In general, the shared workspace includes a shared version of the attachment of the original communication, referred to herein as a "shared document." Recipients having appropriate permissions are provided access to the shared document. Recipients lacking requisite permissions are not provided access to the shared document.

Operational flow then proceeds to a second decision module 140. The second decision module 140 is configured to evaluate those recipients having appropriate permissions to access the shared document. Specifically, when the second decision module 140 determines that a given recipient is internal to access the shared document, operational flow proceeds to a link insertion module 145. The link insertion module 145 is configured to populate the original communication with a link to the shared document. In general, address information contained within the link corresponds to a unique "communication id" of the original communication.

Following insertion of the link by the link insertion module 145, operational flow proceeds to the delivery module 120. In the example instance, the delivery module 120 is configured to release the communication to internal access recipients including both the original attachment and the link. These internal access recipients may access the original communication in a compatibly configured messaging application and optionally choose to select the original attachment and/or choose to select the link to access the shared document as desired. Following release of the communication by the delivery module 120, operational flow proceeds to the end module 125.

When the second decision module 140 determines that a given recipient is external (i.e., not approved) and will not be able to access the shared document, operational flow proceeds to the delivery module 120. In the example instance, the delivery module 120 is configured to release the communication to non-approved access recipients including only the original attachment. These non-approved access recipients may access the original communication in a compatibly-configured messaging application. In this manner, non-approved access recipients may only choose to select the original attachment. Following release of the communication by the delivery module 120, operational flow proceeds to the end module 125.

Further scenarios and workflow associated with provisioning a shared document workspace based on an attachment contained within an electronic communication are described below in connection with FIGS. 2-8.

Figure 2:
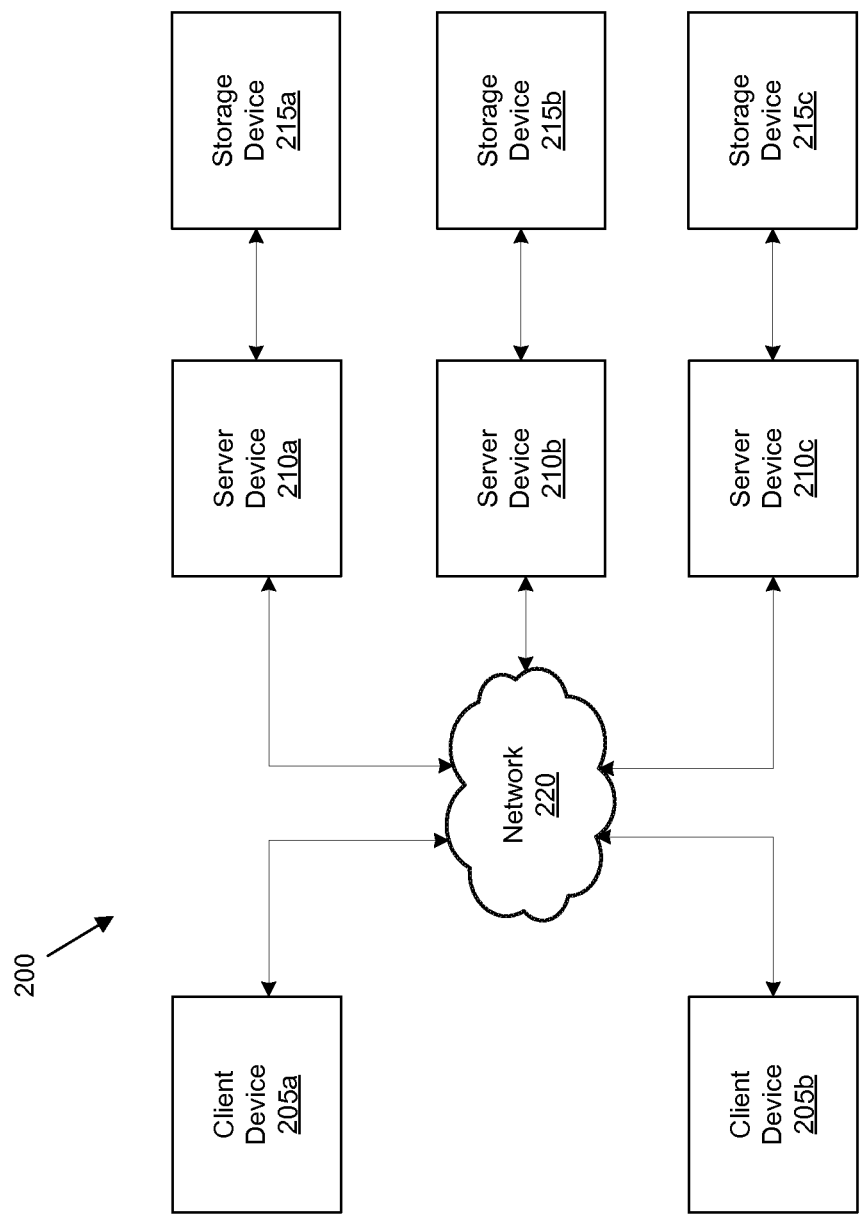
FIG. 2 shows an example networked computing environment.

Referring now to FIG. 2, an example networked computing system environment 200 is shown. The networked computing system environment 200 includes a plurality of client devices 205a-b (collectively, client devices 205), a plurality of server devices 210a-c (collectively, server devices 210), a plurality of storage devices 215a-c (collectively, storage devices 215), and a network 220. Other embodiments of the networked computing system environment 200 are possible as well. For example, the networked computing system environment 200 may generally include more or fewer devices, networks, and other components as desired.

The client devices 205 and the server devices 210 are general purpose computing devices, such as described below in connection with FIG. 3. In example embodiments, the server devices 210 are a business server that implements business processes. Example business processes include messaging process, collaboration processes, data management processes, and others. Exchange server from Microsoft Corporation of Redmond, Wash. is an example of a business server that implements messaging and collaborative business processes in support of electronic mail, calendaring, and contacts and tasks features, in support of mobile and web-based access to information, and in support of data storage. SHAREPOINT® collaboration server, also from Microsoft Corporation, is an example of a business server that implements business processes in support of collaboration, file sharing and web publishing. Other business processes are possible.

In some embodiments, the server devices 210 include of a plurality of interconnected server devices operating together in a "Farm" configuration to implement business processes. Still other embodiments are possible.

The storage devices 215 are a data storage device such as a relational database or any other type of persistent data storage device. The storage devices 215 store data in a predefined format such that the server devices 210 can query, modify, and manage data stored thereon. Examples of such a data storage device include mailbox stores and address services such as ACTIVE DIRECTORY® directory service from Microsoft Corporation. Other embodiments of the storage devices 215 are possible.

The network 220 is a bi-directional data communication path for data transfer between one or more devices. In the example shown, the network 220 establishes a communication path for data transfer between the client devices 205 and the server devices 210. In general, the network 220 can be of any of a number of wireless or hardwired WAN, LAN, Internet, or other packet-based communication networks such that data can be transferred among the elements of the networked computing system environment 200. Other embodiments of the network 220 are possible as well.

Figure 3:
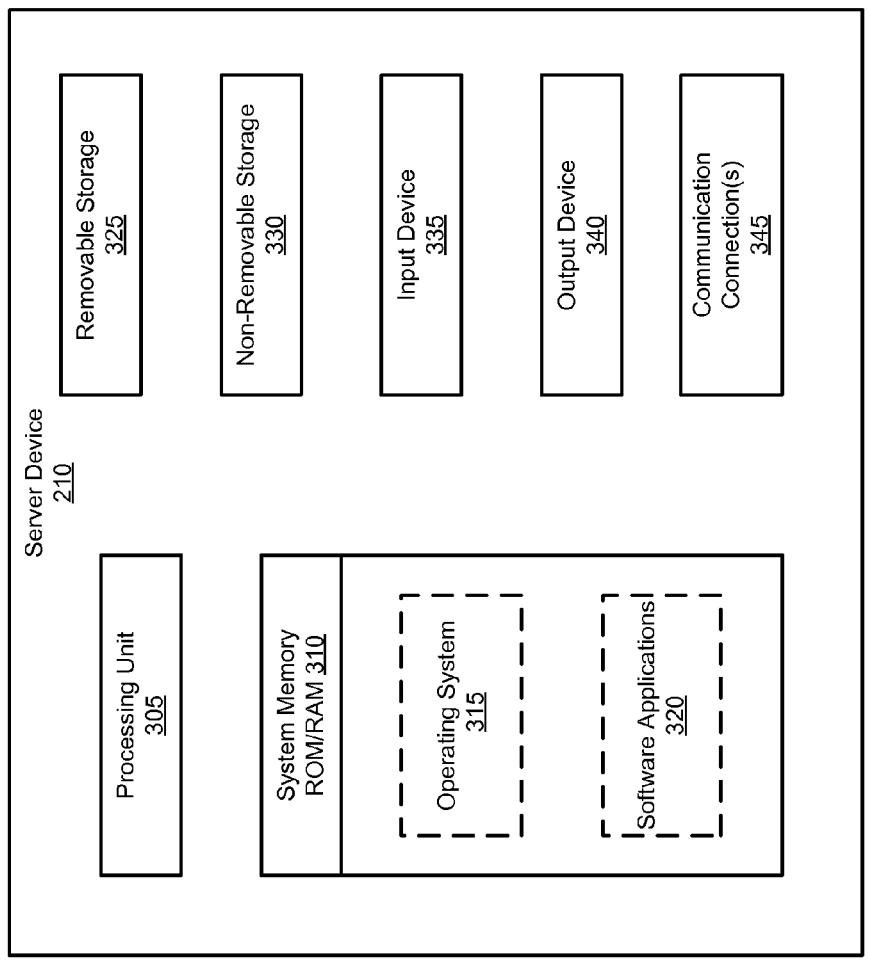
FIG. 3 shows an example server computing device of the environment of FIG. 2.

Referring now to FIG. 3, the server devices 210 of FIG. 2 are shown in further detail. As mentioned above, the server devices 210 are a general purpose computing device. Example general purpose computing devices include a desktop computer, laptop computer, personal data assistant, smartphone, cellular phone, and other computing devices.

The server devices 210 include at least one processing unit 305 and a system memory 310. The system memory 310 can store an operating system 315 for controlling operation of the server devices 210 or another computing device. One example operating system 315 is WINDOWS® operating system from Microsoft Corporation, or a server, such as Exchange server, SHAREPOINT® collaboration server, and others.

The system memory 310 may also include one or more software applications 320 and may include program data. Software applications 320 may include many different types of single and multiple-functionality programs, such as an electronic mail program, a calendaring program, an Internet browsing program, a spreadsheet program, a program to track and report information, a word processing program, and many others. One example is the Office suite of applications from Microsoft Corporation.

The system memory 310 can include physical computer readable storage media such as, for example, magnetic disks, optical disks, or tape. Such additional storage is illustrated in FIG. 3 by removable storage 325 and non-removable storage 330. Computer readable storage media can include physical volatile and nonvolatile, removable and non-removable media implemented in any method or technology for storage of information, such as computer readable instructions, data structures, program modules, or other data.

Computer readable storage media can also include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the server devices 210. Any such computer storage media may be part of or external to the server devices 210.

Communication media is distinguished from computer readable storage media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The server devices 210 can also have any number and type of an input device 335 and output device 340. An example input device 335 includes a keyboard, mouse, pen, voice input device, touch input device, and others. An example output device 340 includes a display, speakers, printer, and others. The server devices 210 can also contain a communication connection 345 configured to enable communications with other computing devices over a network (e.g., network 220 of FIG. 2) in a distributed computing system environment.

Figure 4:
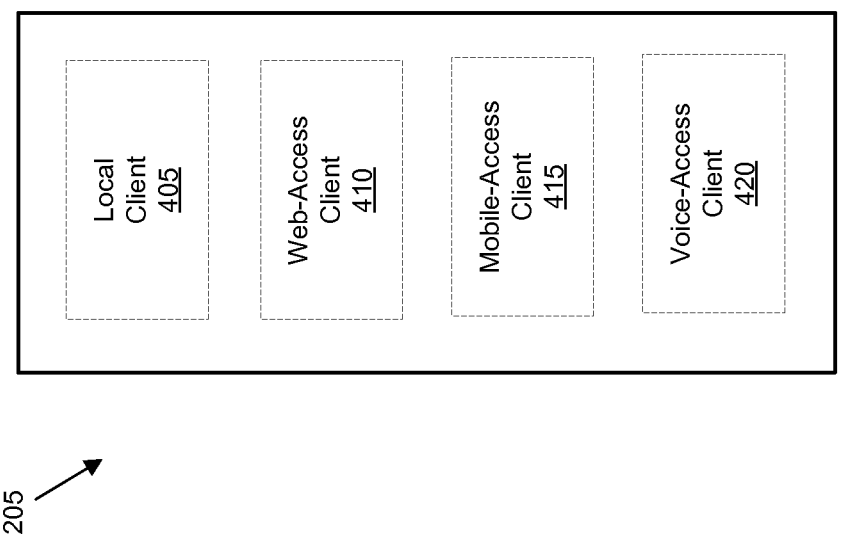
FIG. 4 shows example logical modules of a client device of the environment of FIG. 2.

In example embodiments, the client devices 205 of FIG. 2 are configured similar to the server devices 210 described above. Referring now additionally to FIG. 4, the client devices 205 of FIG. 2 are also configured to include one or more different types of client interfaces to the server devices 210. In the example shown, the client devices 205 include a local client 405, a web-access client 410, a mobile-access client 415, and a voice-access client 420. Other types of client interfaces to the server devices 210 are possible.

The local client 405 is configured as a dedicated messaging and collaboration client that serves as an interface to the server devices 210, and is part of a suite of applications executing on the client devices 205. In one embodiment, the local client 405 includes the OUTLOOK® messaging and collaboration client, which is an e-mail application that is part of the Office suite from Microsoft Corporation. A user can compose, interact with, send and receive e-mails with the OUTLOOK® messaging and collaboration client. Other embodiments of the local client 405 are possible.

The web-access client 410 is configured to accesses the server devices 210 remotely using a network connection, such as the Internet. In one embodiment, the web-access client 410 is the Outlook Web Access (OWA) webmail service of Exchange Server. In the example embodiment, the client devices 205 use a web browser to connect to Exchange Server via Outlook Web Access. This brings up a user interface similar to the interface in the OUTLOOK® messaging and collaboration client in which a user can compose, interact with, send and receive e-mails. Other embodiments of the web-access client 410 are possible. For example, the web-access client 410 may be configured to connect to SHAREPOINT® collaboration server to access corresponding collaboration, file sharing and web publishing services. Still other embodiments of the web-access client 410 are possible.

The mobile-access client 415 is another type of client interface to the server devices 210. In one embodiment, the mobile-access client 415 includes the Mobile Access with ACTIVESYNC® technology or the Windows Mobile Device Center for WINDOWS VISTA® operating system or Windows 7 operating system, all from Microsoft Corporation. Example mobile devices include a cellular telephone, smartphone, a personal digital assistant, and others. Other embodiments of the mobile-access client 415 are possible.

The voice-access client 420 is yet another type of client interface to the server devices 210. In some embodiments, the voice-access client 420 includes Exchange Unified Messaging that is supported in Exchange Server. With Unified Messaging, users have one inbox for e-mail and voicemail. Voicemails are delivered directly into the OUTLOOK® messaging and collaboration client inbox. The message containing the voicemails may also include an attachment. Other embodiments of the voice-access client 420 are possible.

Figure 5:
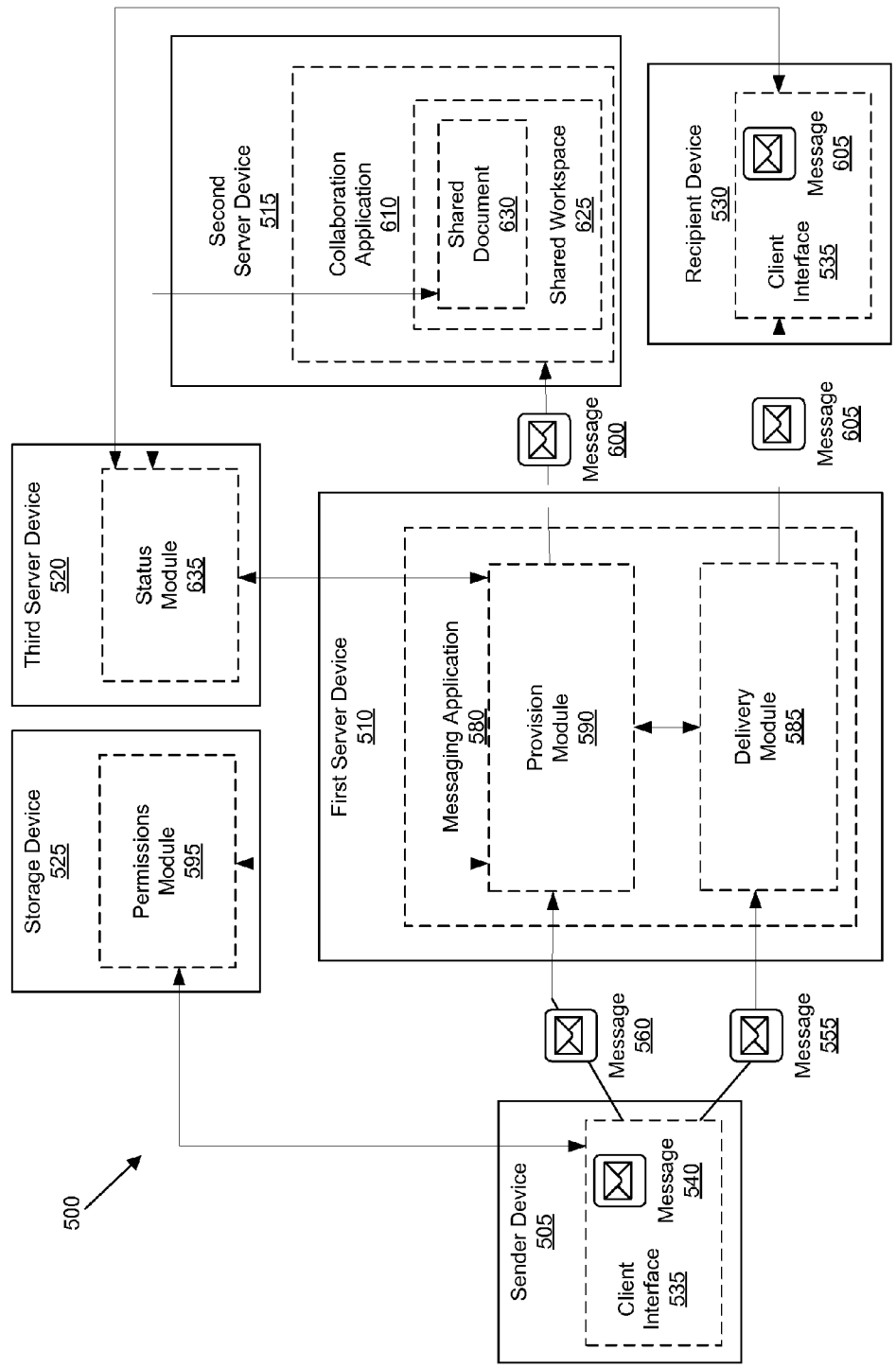
FIG. 5 shows example communications between computing devices for provisioning a shared workspace based on an attachment contained within an electronic communication.

Referring now to FIG. 5, an example block diagram 500 illustrates communications between computing devices to provision a shared document workspace based on an attachment contained within an electronic communication.

The block diagram 500 includes a sender device 505, a first server device 510, a second server device 515, a third server device 520, a storage device 525, and a recipient device 530.

Other configurations are possible. For example, the block diagram 500 may generally include more or fewer devices and other components as desired. Additionally, functionality implemented by the first server device 510, second server device 515, third server device 520 may be partially or wholly shared between and/or implemented by one or more of the first server device 510, second server device 515, third server device 520.

In example embodiments, the sender device 505, first server device 510, second server device 515, third server device 520, storage device 525, and recipient device 530 are configured similar to the respective client devices 205, server devices 210, and storage devices 215 described above in connection with FIGS. 2 and 3. The sender device 505 and the recipient device 530 each further include a client interface 535 similar to the client interfaces described above in connection with FIG. 4.

Figure 6:
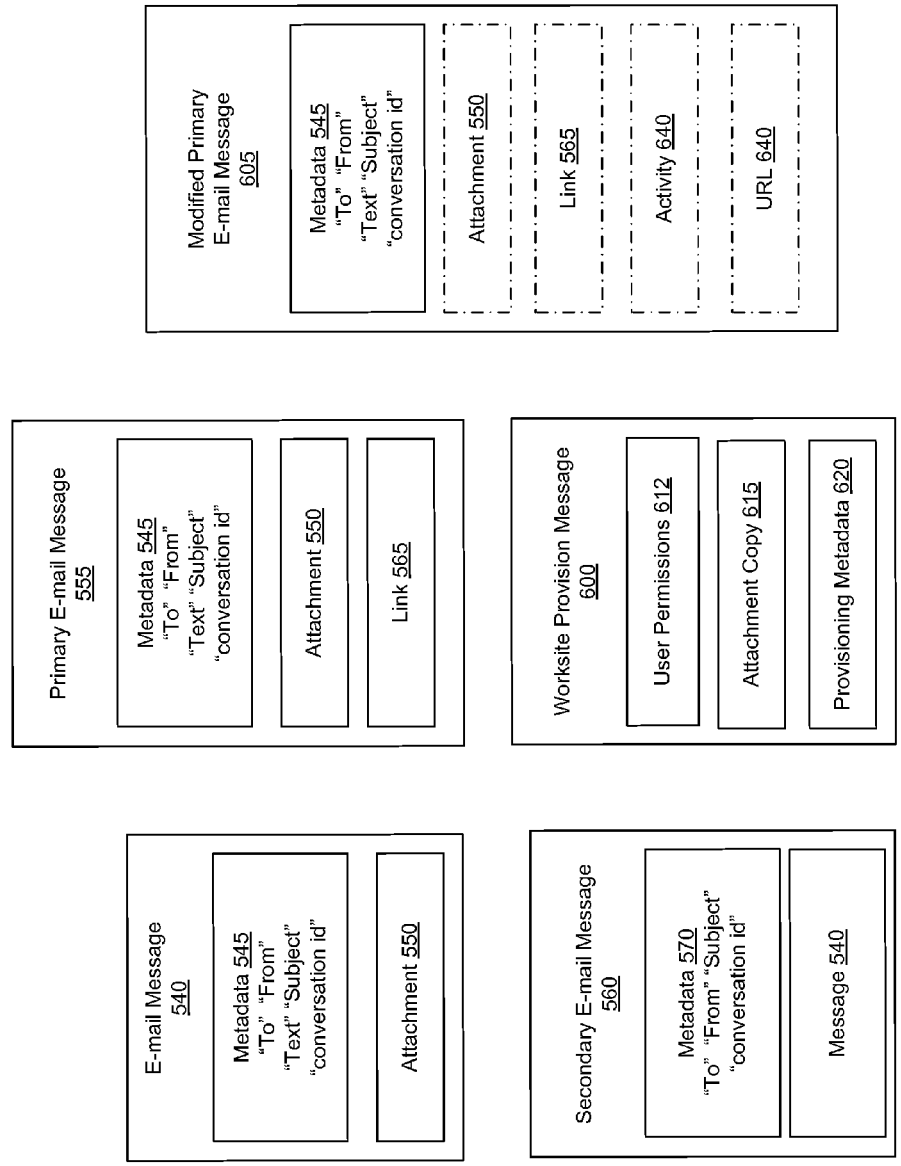
FIG. 6 shows example messages transferred between computing devices of FIG. 5.

In one example scenario, an electronic communication, such as an e-mail message 540, is composed on the sender device 505 via the client interface 535. Referring now additionally to FIG. 6, composition of the e-mail message 540 includes adding content such as first metadata 545 and an attachment 550. First metadata 545 may include a recipient SMTP address "To", a sender SMTP address "From", text "Text", a subject "Subject" corresponding to text of a subject line of the e-mail message 540, a message identification "conversation id" specific to a conversation or thread associated with the e-mail message 540, and other information as desired. In example embodiments, the recipient corresponds to the recipient device 530.

The e-mail message 540 is sent following composition thereof, such as when a user operating the sender device 505 selects "Send" within the corresponding client interface 535. Subsequently, the client interface 535 of the sender device 505 is configured to intercept and analyze content of the e-mail message 540. In the example scenario, the client interface 535 determines that the e-mail message 540 includes the attachment 550 and generates a primary e-mail message 555 and a secondary e-mail message 560.

Still additionally referring to FIG. 6, the primary e-mail message 555 includes the first metadata 545 and the attachment 550 of the e-mail message 540, and further includes a first link 565. In the example embodiment, the client interface 535 is configured to insert the first link 565 into the e-mail message 540. As described in further detail below, the first link 565 is a hyperlink defined by the "conversation id" of the e-mail message 540 pointing to a shared version of the attachment 550 that is housed in a provisioned shared workspace.

The secondary e-mail message 560 includes second metadata 570 and an attached copy of the e-mail message 540. In the example embodiment, the client interface 535 of the sender device 505 is configured to insert the e-mail message 540 into the secondary e-mail message 560 as an attachment. The second metadata 570 is similar to the first metadata 545 of the e-mail message 540 and includes a recipient SMTP address "To", a sender SMTP address "From", a subject "Subject" corresponding to text of a subject line of the e-mail message 540, a message identification "conversation id" associated with the e-mail message 540, and other information. In example embodiments, the "Text" of the first metadata 545 is stripped from the e-mail message 540 as attached to the secondary e-mail message 560 to prevent undesired violation of privacy. Additionally, in example embodiments, the recipient SMTP address of the second metadata 570 is dissimilar to the e-mail message 540, as described in further detail below. Other embodiments are possible.

Referring now specifically to FIG. 5, the client interface 535 of the sender device 505 is configured to send the primary e-mail message 555 and the secondary e-mail message 560 to a messaging application 580 of the first server device 510. The messaging application 580 is a server application configured to provide communications related business services, and includes a delivery module 585 and a provision module 590. An example of such a server application includes Exchange Server. Other embodiments are possible.

In the example shown, the primary e-mail message 555 is sent to the delivery module 585. The delivery module 585 is configured as a repository and temporarily holds the primary e-mail message 555 for potential modification prior to delivery to the recipient device 530, as described in further detail below.

The secondary e-mail message 560 is sent to the provision module 590 by virtue of the corresponding recipient SMTP address of the second metadata 570 being defined as an address of the provision module 590. Upon receipt of the secondary e-mail message 560, the provision module 590 is configured to extract the first metadata 545 and attachment 550 of the e-mail message 540, including the recipient SMTP address associated with the user of the recipient device 530.

The provision module 590 is further configured to access and query a permissions module 595 maintained on the storage device 525. In general, the permissions module 595 is populated with recipient-specific metadata containing user permissions designating whether a given recipient has proper permissions to access a shared document workspace. In the example embodiment, the provision module 590 determines that the user of the recipient device 530 associated with the recipient SMTP address has proper permissions to access a shared workspace including a shared version of the attachment 550, as described further below. In one embodiment, the example permissions module 595 is incorporated within the ACTIVE DIRECTORY® directory service. Other embodiments are possible.

Following authentication of credentials of the user of the recipient device 530, the provision module 590 generates a worksite provision message 600. The provision module 590 additionally communicates with the delivery module 585 to release a modified primary e-mail message 605, described in further detail below.

The provision module 590 is configured to send the worksite provision message 600 to a collaboration application 610 of the second server device 515. In example embodiments, the collaboration application 610 is a server application configured to provide collaboration, file sharing and web publishing services. An example of such a server application includes the SHAREPOINT® Server. Other embodiments are possible.

Still additionally referring to FIG. 6, the worksite provision message 600 includes user permissions 612, an attachment copy 615 corresponding to a copy of the attachment 550 of the e-mail message 540, and workspace provisioning metadata 620. The collaboration application 610 is configured to extract the user permissions 612, attachment copy 615, and workspace provisioning metadata 620 to create a shared workspace 625 including a shared document 630 corresponding to a shared version of the attachment 550. The user permissions 612 being used to designate users (i.e., user of recipient device 530) that are provided access to the shared document 630. In example embodiments, the workspace provisioning metadata 620 includes the "communication id" and "subject" of the e-mail message 540. The "communication id" being used to define the first link 565 that points to the shared document 630 and the "subject" used to define a "name" of the shared workspace 625. Other embodiments are possible.

As mentioned above, the provision module 590 additionally communicates with the delivery module 585 to release the modified primary e-mail message 605. In the example embodiment, the modified primary e-mail message 605 includes the first metadata 545, attachment 550, and first link 565 of the primary e-mail message 555. The modified primary e-mail message 605 is populated as described by virtue of the credentials of the user of the recipient device 530 being authenticated by the provision module 590. The user of the recipient device 530 may access the modified primary e-mail message 605 via the client interface 535 of the recipient device 530 and choose to select the attachment 550 and/or choose to select the first link 565 to access the shared document 630 as desired.

Also as mentioned above, the block diagram 500 additionally includes a third server device 520. In the example shown, the third server device 520 includes a status module 635 that periodically accesses and stores state metadata associated with the shared document 630. The state metadata can be used to track activity associated with the shared document 630. Example activity includes read activity, change activity, and others. The provision module 590 is configured to query the status module 635 to obtain current state metadata associated with the shared document 630 when the messaging application 580 receives a communication (i.e., primary e-mail message 555, secondary e-mail message 560) including a reference to the shared document 630. Subsequently, the delivery module 585 is configured to insert formatted activity information 640 associated with shared document 630 into the modified primary e-mail message 605 prior to release. In this manner, the user of the recipient device 530 is informed of activity related to the shared document 630. Other embodiments are possible, as described further below.

Other scenarios and workflow associated with the example block diagram 500 are possible. For example, in embodiments in which a given user does not have permissions to access the shared document 630, the delivery module 585 is configured to release the modified primary e-mail message 605 only including the first metadata 545 and attachment 550. In other embodiments in which a given user does not have permissions to access the shared document 630, the modified primary e-mail message 605 may include the first metadata 545 and attachment 550 of the primary e-mail message 555, as well as a URL 645 (e.g., see FIG. 6) that contains a link to an unsecured on-line location of a shared version of the attachment 550. In the example embodiment, the URL 645 may be inserted into the modified primary e-mail message 605 by the delivery module 585 upon instructions from the provision module 590. The instructions being retrieved by the provision module 590 from the permissions module 595 of the storage device 525. Still other embodiments are possible.

In some embodiments, the client interface 535 of the sender device 505 is further configured to access and query the permissions module 595 of the storage device 525. In the example embodiment, the client interface 535 of the sender device 505 may determine users having proper permissions to access the shared document 630 and populate the modified primary e-mail message 605 with this information such that the provision module 590 is relieved of this task. The client interface 535 of the sender device 505 subsequently passes the populated modified primary e-mail message 605 to the delivery module 585 of the first server device 510. Additionally, the URL 645 may be inserted into the primary e-mail message 555 by the client interface 535 of the sender device 505 upon access of the permissions module 595 of the storage device 525.

In some embodiments, the messaging application 580 may be configured to intercept and analyze the content of the e-mail message 540 to relieve the client interface 535 of the sender device 505 of this task. In the example embodiment, the e-mail message 540 may be delivered directly to the delivery module 585, which in turn may be transferred to the provision module 590 for subsequent processing to provision the shared workspace 625.

Additionally, in some embodiments, the client interface 535 of the recipient device 530 is configured to query the status module 635 to obtain current state metadata associated with the shared document 630 upon receipt and/or opening of the modified primary e-mail message 605. Such a configuration is beneficial as activity associated with the shared document 630 is typically independent of the e-mail message 540 and/or modified primary e-mail message 605.

Still other scenarios and workflow associated with the example block diagram 500 are possible. For example, referring now to FIG. 7, the example block diagram 500 is configured to support modification of shared documents and modification of user access to shared documents upon the modified primary e-mail message 605 being further sent to one or more recipients.

Figure 7:
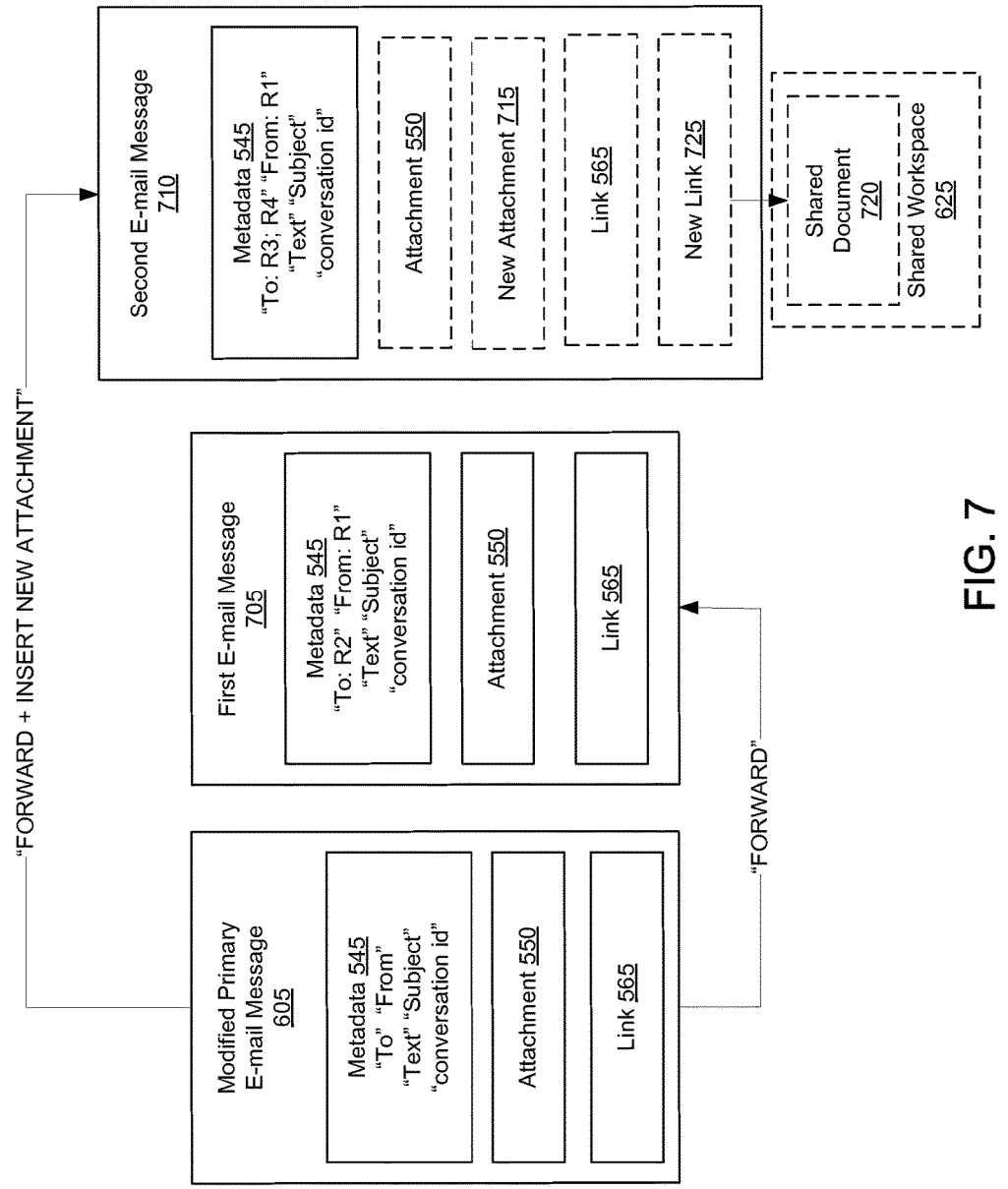
FIG. 7 shows example forwarding scenarios of an e-mail message.

Specifically, FIG. 7 shows the modified primary e-mail message 605 including the first metadata 545, attachment 550, and first link 565.

In one embodiment, the modified primary e-mail message 605 is forwarded as a first e-mail message 705 to a recipient R2 ("To: R2") from a recipient R1 ("From: R1") corresponding to the user of the recipient device 530, described above in connection with FIGS. 5 and 6. In the example embodiment, flow of the first e-mail message 705 is similar to flow of the e-mail message 540 described above. However, the collaboration application 610 is configured to modify access rights to the shared document 630 to include recipient R2 upon the provision module 590 of the messaging application 580 affirmatively authenticating credentials of the recipient R2. Subsequently, the recipient R2 may access the first e-mail message 705 via a compatibly configured client interface and choose to select the attachment 550 and/or choose to select the first link 565 to access the shared document 630 as desired.

In another embodiment, the modified primary e-mail message 605 is forwarded as a second e-mail message 710 to a recipient R3 and recipient R4 ("To: R3; R4") from recipient R1. In the example embodiment, recipient R1 has attached a new attachment 715 to the second e-mail message 710. Flow of the second e-mail message 710 is similar to flow of the e-mail message 540 described above. However, the collaboration application 610 is configured to modify access rights to the shared document 630 to include recipient R3 and R4, upon the provision module 590 of the messaging application 580 affirmatively authenticating credentials of the recipients R3 and R4.

Additionally, a new shared document 720 is provisioned in the shared workspace 625 linked to by a new link 725. The new link 725 inserted into the second e-mail message 710. Subsequently, the recipient R3 and R4 may access the second e-mail message 710 via a compatibly configured client interface and choose to select the attachment 550 and new attachment 715, and/or choose to select the first link 565 and the new link 725 to access the shared document 630 and the new shared document 720 as desired.

In general, the collaboration application 610 is configured to optimally organize and manage shared documents and permissions to shared documents in a shared workspace. In one example, the collaboration application 610 is a SHARE-POINT® collaboration server that allows documents to be stored and edited. For example, the documents stored on the second server device 515 can be accessed, edited, versioned and otherwise modified using the collaboration application 610.

In one example, when the example systems and methods described herein are used to automatically provision a workspace for an attachment, a folder is created on the second server device 515, and the collaboration application 610 stores the attachment in the folder. The collaboration application 610 also sets permissions regarding which users can access and manipulate the attachments in the folders based on the recipient-specific metadata. For example, the collaboration application 610 can set permissions such that only those users in the "To" field of the communication have rights to access the attachments stored in the folder. In other examples, rights can be defined on a per-attachment basis. Other configurations are possible. Still other scenarios and workflow associated with the block diagram 500 are possible.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of sharing attachments, comprising:
receiving a communication that includes an attachment, a unique communication identification (ID), a link pointing to a shared version of the attachment based on the unique communication ID, and an identification of a first and a second recipient;
based on the communication, determining that the first recipient has document-sharing permissions and that the second recipient does not have document-sharing permissions;
based on the sharing permissions of the first and second recipients and on the unique communication ID, provisioning a shared document workspace that includes the shared version of the attachment obtained from the communication;
modifying the communication to a first-recipient communication, the first-recipient communication identifying only the first recipient and including the attachment and the link pointing to the shared version of the attachment now provisioned in the shared document workspace, and releasing the first-recipient communication to the first recipient; and
modifying the communication to a second-recipient communication, the second-recipient communication identifying only the second recipient, including the attachment and excluding the link pointing to the shared version of the attachment now provisioned in the shared document workspace, and releasing the second-recipient communication to the second recipient.

2. The method of claim 1, wherein the communication is selected from a group including: an e-mail message, a text message, and an instant message.

3. The computing device of claim 1, wherein the attachment is selected from a group including: a document file, a program file, and a media file.

4. A system for sharing attachments, comprising:
a processing unit; and
a system memory connected to the processing unit, the system memory including instructions that, when executed by the processing unit, cause the system to be operable to:
receive a communication that includes an attachment, a unique communication identification (ID), a link pointing to a shared version of the attachment based on the unique communication ID, and an identification of a first and a second recipient;
based on the communication, determine that the first recipient has document-sharing permissions and that the second recipient does not have document-sharing permissions;
based on the sharing permissions of the first and second recipients and on the unique communication ID, provisioning a shared document workspace that includes the shared version of the attachment obtained from the communication;
modifying the communication to a first-recipient communication, the first-recipient communication identifying only the first recipient and including the attachment and the link pointing to the shared version of the attachment now provisioned in the shared document workspace, and releasing the first-recipient communication to the first recipient; and modifying the communication to a second-recipient communication, the second-recipient communication identifying only the second recipient, including the attachment and excluding the link pointing to the shared version of the attachment now provisioned in the shared document workspace, and releasing the second-recipient communication to the second recipient.

5. The system of claim 4, wherein the communication is selected from a group including: an e-mail message, a text message, and an instant message.

6. A method of sharing attachments, comprising:
receiving a first communication based on an original communication that included an attachment, wherein the first communication includes the attachment, a link pointing to a shared version of the attachment and an identification of a first recipient and a second recipient, wherein the link is based on a communication id unique to the original communication;
receiving a second communication based on the original communication, wherein the second communication includes the identification of the first recipient and the second recipient, a copy of the original communication including the attachment and the communication id unique to the original communication;
based on the second communication, determining that the first recipient has document-sharing permissions and that the second recipient does not have document-sharing permissions;
based on the sharing permissions of the first and second recipients and on the communication ID provided in the second communication, provisioning a shared document workspace that includes the shared version of the attachment obtained from the second communication;
modifying the first communication to a first-recipient communication, the first-recipient communication identifying only the first recipient and including the attachment and the link pointing to the shared version of the attachment now provisioned in the shared document workspace, and releasing the first-recipient communication to the first recipient; and
modifying the first communication to a second-recipient communication, the second-recipient communication identifying only the second recipient, including the attachment and excluding the link pointing to the shared version of the attachment now provisioned in the shared document workspace, and releasing the second-recipient communication to the second recipient.

7. The method of claim 1, wherein the communication is based on an original communication comprising an e-mail message generated from a client messaging interface that is configured to analyze content of the e-mail message and generate the communication based on the analysis.

8. The method of claim 7, wherein determining that the first recipient has document-sharing permissions includes determining that the first recipient is identifiable within data storage associated with the client messaging interface.

9. The method of claim 8, wherein determining that the second recipient does not have document sharing permissions includes determining that second recipient is not identifiable within the data storage associated with the client messaging interface.

10. The method of claim 1, wherein modifying the communication to the second-recipient communication includes including a URL providing unsecured on-line access to a non-provisioned shared version of the attachment in the second-recipient communication.

11. The method of claim 10, wherein modifying the communication to the first-recipient communication includes including the URL providing unsecured on-line access to a non-provisioned shared version of the attachment in the first-recipient communication.

12. The method of claim 1, wherein the modifying the communication to the first-recipient communication includes providing a state of the shared document in the first-recipient communication.

13. The method of claim 12, wherein the state indicates change activity in relation to the shared document.

14. The method of claim 1, wherein the link is additionally based on a subject of the communication and wherein the subject of the communication defines a name of the shared document workspace.

15. The system of claim 4, wherein the communication comprises an e-mail message generated from a client messaging interface that is configured to analyze content of the e-mail message and generate the communications based on the analysis.

16. The system of claim 15, wherein the determination that the first recipient has document-sharing permissions includes a determination that the first recipient is identifiable within data storage associated with the client messaging interface.

17. The system of claim 16, wherein the determination that the second recipient does not have document sharing permissions includes a determination that second recipient is not identifiable within the data storage associated with the client messaging interface.

18. The system of claim 4, wherein the modification of the communication to the second-recipient communication includes a URL providing unsecured on-line access to a non-provisioned shared version of the attachment in the second-recipient communication.

19. The system of claim 18, wherein the modification of the communication to the first-recipient communication includes the URL providing unsecured on-line access to a non-provisioned shared version of the attachment in the first-recipient communication.

20. The system of claim 4, wherein the modification of the communication to the first-recipient communication includes providing a state of the shared document in the first-recipient communication.

* * * * *